Dec. 15, 1931.  M. LARSSON  1,836,672
METHOD OF LEACHING PHOSPHATE ROCK
Filed Jan. 15, 1931
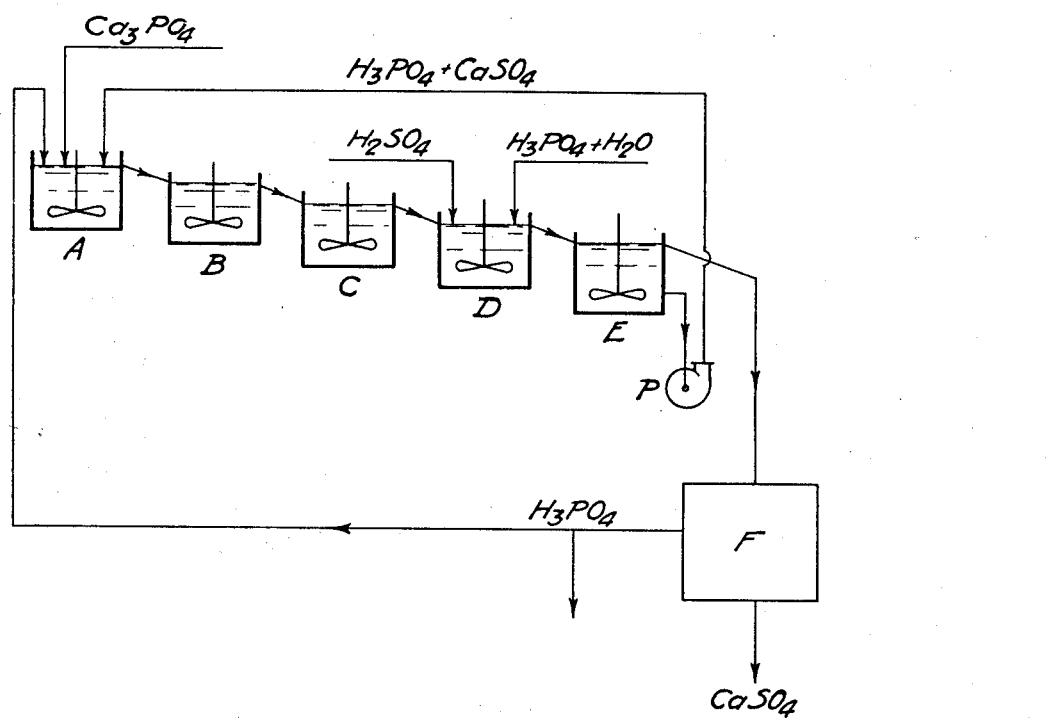
MARKUS LARSSON
INVENTOR Patented Dec. 15, 1931

1,836,672

UNITED STATES PATENT OFFICE

MARKUS LARSSON, OF BERLIN, GERMANY, ASSIGNOR TO KUNSTDUNGER-PATENT-VER-WERTUNGS AKTIENGESELLSCHAFT, OF GLARUS, SWITZERLAND

METHOD OF LEACHING PHOSPHATE ROCK

Application filed January 15, 1931, Serial No. 508,830, and in Sweden February 13, 1930.

It is known to produce alkali phosphates or mixed fertilizers free from lime and containing nitrogen, phosphoric acid and possibly potash by leaching phosphate rock with a suitable acid and separating the lime of the phosphate rock as calcium sulphate. For this purpose either sulphuric acid with or without cooperation of alkali sulphate or another mineral acid the calcium salt of which is soluble with cooperation of alkali sulphate as precipitating agent for the lime is used. The alkali sulphate, preferably ammonium sulphate, potassium sulphate or potassium bisulphate, is in such case either used at the leaching itself or added to the solution obtained by leaching with the acid alone.

It is also known to produce mixed fertilizers containing soluble phosphates by leaching phosphate rock with sulphuric acid and neutralizing the phosphoric acid solution with ammonia after its separation from the precipitated calcium sulphate and then to add potassium chloride or ammonium nitrate or both to the solution of ammonium phosphate whereupon the solution is evaporated.

It has further been proposed to utilize the calcium sulphate precipitated in the process for the producing of ammonium sulphate by reacting upon it by means af ammonia and carbon dioxide, whereupon the ammonium sulphate solution thus produced is used as washing liquid for the washing of precipitated calcium sulphate and then as precipitating agent for the lime in or after the leaching of a further quantity of phosphate rock.

A draw-back in such processes is that the calcium sulphate is generally precipitated in a state difficult to separate from the solution if the solution is not very much diluted, the calcium sulphate precipitated and the solution forming together a rather thickly-fluid mass which also after a long settling has no appreciable tendency to separate into a layer of liquid free from solid substances and a sediment of the solid substances. It is, therefore, practically impossible to wash out the solution produced from the precipitate in a so-called Dorr plant or similar apparatus, and the practical use of such processes has been limited to the treatment of special raw materials which give a well-settling calcium sulphate, or the process was carried out with highly diluted solutions which require an expensive subsequent evaporation work for the recovery of the salts of the solution in solid state.

The same draw-back is also found in the production of phosphoric acid by the leaching of phosphate rock with sulphuric acid in which process it was hitherto necessary to use a highly diluted sulphuric acid in order to facilitate the separation of the phosphoric acid produced from the precipitate of calcium sulphate by filtering, and then a rather expensive evaporation work was necessary to bring the phosphoric acid to the concentration generally required for technical use.

Another draw-back in such leaching processes is the difficulty of obtaining a quantitative output of phosphoric acid due to the fact that the calcium sulphate is partly precipitated as a tight coating on the larger grains of the phosphate rock thus preventing the leaching liquor from dissolving said grains completely. In order to obtain a good yield in such leaching operations it was, therefore, generally necessary to use a very finely ground and classified phosphate rock.

The object of this invention is to avoid the said draw-backs and to render it possible to attain a very good output without any extreme grinding of the phosphate rock and, further, to render it possible to use all kinds of phosphate rock in the leaching process and to produce directly comparatively strong solutions.

The invention consists, chiefly, in this that a portion of unseparated products obtained in the process and consisting chiefly of phosphoric acid solution and calcium sulphate is returned in the process and mixed with the phosphate rock to be dissolved before the leaching acid and the alkali sulphate possibly used are added.

In the performance of the reaction the temperature is, preferably, kept so high in the whole reaction system, that the calcium sulphate is precipitated as semihydrate $$(CaSO_4 . 1/2 H_2O)$$

and maintains said crystal form in the portion of the reaction products circulating in the process. It is for such purpose sufficient to maintain a temperature of about 80° C. if the solutions have a proper concentration and said temperature is easily maintained in the whole circulation system without supply of heat from an external source as the reaction heat at the dissolving of the phosphate rock compensates for all losses of heat due to radiation and evaporation. As the temperature need not be elevated essentially above 80° C. the corroding action of the solutions on the apparatus will be essentially less than when higher temperatures are required.

When sulphuric acid or sulphuric acid with an addition of alkali sulphate is used for the precipitation of the lime, such a large quantity of unseparated reaction products should be returned that in the mixing of said products with the phosphate rock freshly supplied an excess of free acid is present that is sufficient to convert the phosphate rock completely into monocalcium phosphate. When the leaching is effected with another acid than sulphuric acid, said acid is added before the addition of the precipitating agent. In such case it is possible to reduce somewhat the quantity of the unseparated reaction products returned, it being, however, observed that the total quantity of acids is sufficient for the dissolving of the phosphate rock and for the securing of an easily fluid sludge also after the addition of the precipitant. As the phosphate rock thus always is completely or to an essential part dissolved before the precipitant for the lime is added the precipitated calcium sulphate cannot deposit on the grains of phosphate rock but is precipitated chiefly on the semihydrate crystals present in the solution in large quantities whereby said crystals have an opportunity to grow until they form a coarse-crystalline calcium sulphate semihydrate which gives an easily fluid sludge also when rather strong solutions are produced.

The separation of the calcium sulphate from the phosphoric acid solution in the portion of the reaction products which is not returned in the process may be effected according to any well-known method either directly or after the recrystallization of the semihydrate into dihydrate by cooling or dilution of the reaction products or by said steps in combination.

In the accompanying drawing I have shown diagrammatically an apparatus for the production of phosphoric acid according to the invention.

Referring to the drawing, A to E are five vessels each having a stirring device and placed at different levels in such manner that the reaction products can flow by the gravity from one vessel to the next one. P is a pump for returning a portion of the unseparated reaction products from the last reaction vessel E to the first vessel A and F is a separating device for the separation of the phosphoric acid from the calcium sulphate in the portion of the reaction products which is drawn off from the vessel E without being directly returned into the process.

In the vessel A the phosphate rock to be dissolved is introduced together with a suitable quantity of phosphoric acid which has been separated from the precipitated calcium sulphate, and further, large quantities of unseparated reaction products from the last reaction vessel E are supplied. The quantity of phosphoric acid returned is so related to the phosphate rock that the reaction products also after the precipitation of the lime dissolved form an easily fluid sludge. The quantity of the unseparated reaction products returned should be about 5 to 10 cbm. per ton of the phosphate rock treated.

The mixture flows successively over to the vessels B and C, the phosphate rock being at this stage of the process completely or to an essential degree dissolved in the phosphoric acid present. In the vessel D sulphuric acid is added in a quantity sufficient to precipitate completely the lime dissolved and to liberate the phosphoric acid. Together with the sulphuric acid also wash liquid obtained in the separation of the precipitated calcium sulphate from the phosphoric acid produced may be added. Said wash liquid may, however, if desired, be supplied to any of the preceding reaction vessels. As the phosphate rock is completely or chiefly dissolved before the phosphoric acid is added, phosphoric acid cannot as in the known processes be lost by the grains of phosphate rock being coated with calcium sulphate forming an obstacle to the attack of the leaching acid. On account of the large quantity of unseparated reaction products returned the concentration of the lime dissolved in the solution is comparatively small and the calcium sulphate is, therefore, chiefly precipitated on the calcium sulphate crystals already present in the solution. The process results in the producing of a coarse well-settling precipitate which can be separated from the solution by filtering or decantation, and a solution containing 30 to 35% of $P_2O_5$ or more, if a high-grade phosphate is used, can be produced with an output of 98% or more. The calcium sulphate may be precipitated as dihydrate, $$CaSO_4.2H_2O,$$

as semihydrate, $CaSO_4.1/2H_2O$, or as anhydrite, $CaSO_4$, dependent on the temperature used and the concentration of the solution.

In spite of the large quantity of reaction products circulating in the process it is not necessary to enlarge the apparatus in comparison with the apparatus required for the known processes but it is even possible to attain an increased production with a given apparatus in comparison with the methods hitherto used.

The apparatus and the process will be substantially the same as above described when alkali phosphate or mixed fertilizers containing alkali phosphate are to be produced. In leaching with an acid the calcium salts of which are soluble, as for instance nitric acid, said acid is introduced into the first reaction vessel together with the phosphate rock and a portion of unseparated reaction products from the last reaction vessel while the precipitating agent, for instance ammonium sulphate, is supplied to one of the last reaction vessels. The circulating unseparated reaction products act in this case chiefly as diluting means but on account of their large percentage of calcium sulphate previously precipitated they have also an essential value for the production of a coarse-crystalline precipitate. They render it also possible to carry out the leaching process with a less quantity of acid than else without any essential part of the phosphate rock remaining undissolved.

The process may be modified in such manner that a part of the circulating sulphate sludge is mixed with the phosphate rock to be dissolved and another part thereof is used to dilute the sulphuric acid or other reagent used to precipitate the calcium sulphate.

*Example 1.—Production of phosphoric acid*

In the first reaction vessel of an apparatus with six reaction vessels finely ground African phosphate rock, phosphoric acid and returned unseparated reaction products were introduced in such proportions that 1 liter of phosphoric acid with 35% $P_2O_5$ and 6 liters of unseparated reaction products per 1 kg. of phosphate rock were used. In the fifth reaction vessel 1, 1 kg. of sulphuric acid with the specific gravity 1,71 and 0,4 liter of wash liquid with 21% $P_2O_5$ obtained in the separation of the phosphoric acid from the insoluble products were added per 1 kg. of phosphate rock used in the process. At the reaction a temperature of 80 to 90° C. was maintained so that the calcium sulphate was precipitated as a coarse-crystalline semihydrate. The reaction products drawn off from the process from the last reaction vessel were filtered and the filter cake was washed with weak phosphoric acid (about 15% $P_2O_5$). The filter cake was then suspended in weak phosphoric acid. The semihydrate now recrystallized rapidly into dihydrate

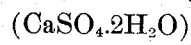

whereupon the mass was filtered and washed with water. The output amounted to 98.5% and the washing loss was only 0.4% of the total phosphoric acid contained in the phosphate rock while the remainder of the phosphoric acid, about 98%, was recovered directly as phosphoric acid with 35% $P_2O_5$.

*Example 2.—Manufacture of a mixed fertilizer*

In the first reaction vessel of an apparatus of the same kind as above described finely ground African phosphate rock, nitric acid and unseparated reaction products were introduced, 1,7 liter of nitric acid with 50% $HNO_3$ and 3,5 liters of unseparated reaction products being used per 1 kg. of phosphate rock. In the fifth reaction vessel 3,5 liters of a solution obtained in washing previously precipitated gypsum with an ammonium sulphate solution containing 40% $Am_2SO_4$, were added per 1 kg. of phosphate rock. The total quantity of $Am_2SO_4$ in the added solution amounted to 1,2 kg. per 1 kg. of phosphate rock. The calcium sulphate was precipitated as dihydrate and could easily be washed free from phosphoric acid and ammonium nitrate on a filter or in a decanting apparatus by means of an ammonium sulphate solution. The washed calcium sulphate together with adhering ammonium sulphate solution was reacted upon in another apparatus by means of ammonia and carbon dioxide for the production of ammonium sulphate and calcium carbonate.

What I claim is:—

1. Method of leaching phosphate rock, which comprises reacting upon the phosphate rock by means of unseparated reaction products from a preceding operation, adding reagents capable of precipitating the lime and liberating the phosphoric acid, and using a portion of the unseparated reaction products in the continuous performance of the process.

2. Method of leaching phosphate rock, which comprises reacting upon the phosphate rock by means of unseparated reaction products from a preceding operation, adding reagents capable of precipitating the lime as calcium sulphate and liberating phosphoric acid, and using a portion of the unseparated reaction products in the continuous performance of the process.

3. Method of leaching phosphate rock, which comprises reacting upon the phosphate rock by means of unseparated reaction products from a preceding operation, adding leaching means containing sulphuric acid and alkali so as to precipitate the lime as calcium sulphate and produce phosphoric acid partly combined with alkali, and using a portion of the unseparated reaction products in the continuous performance of the process.

4. Method of leaching prosphate rock, which comprises reacting upon the phosphate rock by means of unseparated reaction products from a preceding operation and a mineral acid the calcium salts of which are soluble, then adding alkali sulphate to precipitate the lime as calcium sulphate, and using a portion of the unseparated reaction products in the continuous performance of the process.

5. Method of leaching phosphate rock, which comprises reacting upon the phosphate rock by means of unseparated reaction products from a preceding operation and nitric acid, then adding alkali sulphate to precipitate the lime dissolved as calcium sulphate, and using a portion of the unseparated reaction products in the continuous performance of the process.

6. Method of leaching phosphate rock, which comprises reacting upon the phosphate rock by means of unseparated reaction products from a preceding operation, reacting upon the mixture by means of reagents capable of precipitating the lime as calcium sulphate and liberating phosphoric acid, and returning a portion of the unseparated reaction products in the continuous performance of the process, a substantially constant temperature of at least 80° C. being maintained in the different stages of the process, thus causing the calcium sulphate to crystallize as semihydrate and to maintain this form in the reaction products returned.

7. Method of leaching phosphate rock, which comprises reacting upon the phosphate rock by means of unseparated reaction products from a preceding operation and reagents capable of precipitating the lime as calcium sulphate and liberating phosphoric acid, a reaction temperature of at least 80° C. being maintained to cause the calcium sulphate to crystallize as semihydrate, drawing off a portion of the reaction products from the process, separating the chief part of the solution in said portion from the calcium sulphate semihydrate, recrystallizing the latter into dihydrate by suspending it into a weak phosphoric acid solution, and finally separating the dihydrate from said solution.

8. Method of leaching phosphate rock, which comprises reacting upon the phosphate rock by means of unseparated reaction products from a preceding operation, mixing reagents capable of precipitating the lime as calcium sulphate and liberating phosphoric acid with another part of unseparated reaction products, adding the mixture to the reaction and using a portion of the unseparated reaction products in the continuous performance of the process.

In testimony whereof I have signed my name.

MARKUS LARSSON.